(12) United States Patent  (10) Patent No.: US 7,890,480 B2
Barsness et al.  (45) Date of Patent: Feb. 15, 2011

(54) PROCESSING OF DETERMINISTIC USER-DEFINED FUNCTIONS USING MULTIPLE CORRESPONDING HASH TABLES

(75) Inventors: Eric Lawrence Barsness, Pine Island, MN (US); Daniel E. Beuch, Rochester, MN (US); Theresa Renee Euler, Oronoco, MN (US); Paul Stuart Nelsestuen, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 12/028,869

(22) Filed: Feb. 11, 2008

(65) Prior Publication Data

US 2009/0204566 A1  Aug. 13, 2009

(51) Int. Cl.
 *G06F 17/30* (2006.01)
(52) U.S. Cl. .................................................. 707/702
(58) Field of Classification Search .................. 707/702
 See application file for complete search history.

(56) References Cited

U.S. PATENT DOCUMENTS

| | | | | |
|---|---|---|---|---|
| 5,511,190 | A * | 4/1996 | Sharma et al. ...................... | 1/1 |
| 6,009,432 | A * | 12/1999 | Tarin ................................. | 1/1 |
| 6,263,331 | B1 * | 7/2001 | Liu et al. ........................... | 1/1 |
| 6,301,575 | B1 * | 10/2001 | Chadha et al. ..................... | 1/1 |
| 6,338,056 | B1 * | 1/2002 | Dessloch et al. .................. | 1/1 |
| 6,353,820 | B1 * | 3/2002 | Edwards et al. ................... | 1/1 |
| 6,356,888 | B1 * | 3/2002 | Egan et al. ......................... | 1/1 |
| 6,598,051 | B1 * | 7/2003 | Wiener et al. ..................... | 1/1 |
| 6,701,317 | B1 * | 3/2004 | Wiener et al. ..................... | 1/1 |
| 7,058,639 | B1 * | 6/2006 | Chatterjee et al. ................. | 1/1 |
| 7,103,608 | B1 * | 9/2006 | Ozbutun et al. ................... | 1/1 |
| 7,120,864 | B2 * | 10/2006 | Cai et al. ..................... | 715/234 |
| 7,145,906 | B2 * | 12/2006 | Fenner ........................ | 370/392 |
| 7,152,165 | B1 * | 12/2006 | Maheshwari et al. ........ | 713/193 |
| 7,171,427 | B2 * | 1/2007 | Witkowski et al. ................ | 1/1 |
| 7,313,565 | B2 * | 12/2007 | Zhang et al. ...................... | 1/1 |
| 7,313,575 | B2 * | 12/2007 | Carr et al. ......................... | 1/1 |

(Continued)

OTHER PUBLICATIONS

"Understanding User Defined Functions (UDF) in SQL Server 2000", www.extremeexperts.com/sql/articles/UDFFunctions.aspx, copyright 2000-2003, printed Aug. 2, 2010.

(Continued)

*Primary Examiner*—Neveen Abel Jalil
*Assistant Examiner*—Mark Andrew X Radtke
(74) *Attorney, Agent, or Firm*—Martin & Associates, LLC; Derek P. Martin

(57) ABSTRACT

A deterministic UDF processing mechanism processes user-defined functions (UDFs) using multiple hash tables. Data access patterns for a UDF are collected, and an appropriate hash table set is then determined for the UDF from the data access patterns. If a UDF accesses some similar columns and some disjoint columns, the similar columns are grouped together, and one or more hash tables are allocated to the similar columns. Disjoint columns are allocated their own hash tables. In addition, the allocation of hash tables may be adjusted based on historical access patterns collected over time. By dynamically allocating and adjusting sets of hash tables to a deterministic UDF, the performance of the UDF is greatly increased.

16 Claims, 5 Drawing Sheets

U.S. PATENT DOCUMENTS

| | | | |
|---|---|---|---|
| 7,499,912 B2* | 3/2009 | Hershkovich et al. | 1/1 |
| 7,606,792 B2* | 10/2009 | Cunningham et al. | 1/1 |
| 7,653,670 B2* | 1/2010 | Hasan et al. | 1/1 |
| 7,681,240 B2* | 3/2010 | Maheshwari et al. | 726/26 |
| 2004/0006574 A1* | 1/2004 | Witkowski et al. | 707/104.1 |
| 2004/0034616 A1* | 2/2004 | Witkowski et al. | 707/1 |
| 2004/0172267 A1* | 9/2004 | Patel et al. | 705/1 |
| 2005/0091443 A1* | 4/2005 | Hershkovich et al. | 711/100 |
| 2005/0119837 A1* | 6/2005 | Prakash et al. | 702/27 |
| 2005/0166140 A1* | 7/2005 | Cai et al. | 715/513 |
| 2005/0187946 A1* | 8/2005 | Zhang et al. | 707/100 |
| 2005/0210023 A1* | 9/2005 | Barrera et al. | 707/5 |
| 2005/0278270 A1* | 12/2005 | Carr et al. | 706/25 |
| 2006/0041544 A1* | 2/2006 | Santosuosso | 707/4 |
| 2006/0123249 A1* | 6/2006 | Maheshwari et al. | 713/193 |
| 2006/0123250 A1* | 6/2006 | Maheshwari et al. | 713/193 |
| 2006/0248063 A1* | 11/2006 | Gordon | 707/3 |
| 2006/0259344 A1* | 11/2006 | Patel et al. | 705/9 |
| 2007/0036309 A1* | 2/2007 | Zoldi et al. | 379/114.14 |
| 2007/0136331 A1* | 6/2007 | Hasan et al. | 707/100 |
| 2008/0082628 A1* | 4/2008 | Rowstron et al. | 709/217 |
| 2008/0097972 A1* | 4/2008 | Gordon | 707/3 |
| 2008/0133446 A1* | 6/2008 | Dubnicki et al. | 707/1 |
| 2008/0195577 A1* | 8/2008 | Fan et al. | 707/2 |
| 2008/0216051 A1* | 9/2008 | Johnson et al. | 717/110 |

OTHER PUBLICATIONS

"User Defined Functions", www.sqlteam.com/article/user-defined-functions, Oct. 12, 2000.

"User-defined function", http://en.wikipedia.org/wiki/User-defined_function, printed Aug. 3, 2010.

* cited by examiner

US 7,890,480 B2

PROCESSING OF DETERMINISTIC USER-DEFINED FUNCTIONS USING MULTIPLE CORRESPONDING HASH TABLES

BACKGROUND

1. Technical Field

This disclosure generally relates to computer systems, and more specifically relates to database systems.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database. Retrieval of information from a database is typically done using queries. A database query typically includes one or more predicate expressions interconnected with logical operators.

Structured Query Language (SQL) provides a way to write queries to a database. SQL supports user-defined functions. A user-defined function (UDF) in SQL gives the programmer the capability to provide an encapsulated reusable cell in the SQL language. User defined functions can perform any service the programmer wants to implement. The services in a UDF may be very simple or may be quite complex.

A UDF in SQL can be deterministic or non-deterministic. A deterministic UDF is a UDF that is predictable, meaning a set of inputs to the UDF will always produce the same result. A non-deterministic UDF is one that does not always produce the same result given a set of inputs. The disclosure and claims herein deal with deterministic UDFs. Unless otherwise noted herein, the term "UDF" as used herein means a deterministic UDF.

Because a deterministic UDF always returns the same result given a particular set of inputs, a database optimizer may cache the results of executing one or more portions of a UDF. By caching the results, the results may be retrieved and reused later for the same query that has the same inputs. One way that has been used in the art to cache UDF results uses a hash table. In the known implementations of a deterministic UDF, there is one hash table assigned for use with the UDF, which is good for the life of the query. Let's assume for the sake of illustration a UDF invokes function XYZ three times on three individual columns. If the cardinality of the three columns is a disjoint set, meaning they have no values in common, using one hash table for this UDF will provide terrible performance. Without a way to process deterministic UDFs in a more optimized way, processing deterministic UDFs will continue to be inefficient in known database systems.

BRIEF SUMMARY

A deterministic UDF processing mechanism processes user-defined functions (UDFs) using multiple hash tables. Data access patterns for a UDF are collected, and an appropriate hash table set is then determined for the UDF from the data access patterns. If a UDF accesses some similar columns and some disjoint columns, the similar columns are grouped together, and one or more hash tables are allocated to the similar columns. Disjoint columns are allocated their own hash tables. In addition, the allocation of hash tables may be adjusted based on historical access patterns collected over time. By dynamically allocating and adjusting sets of hash tables to a deterministic UDF, the performance of the UDF is greatly increased.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The claims and disclosure herein provide a way to allocate multiple hash tables to a user-defined function (UDF) to improve performance in processing the UDF. The number and allocation of the hash tables is according to historical access patterns that indicate the history of how the UDF has been processed in the past. The number and allocation of hash tables may also be dynamically adjusted over time according to historical access patterns, thereby allowing the UDF to evolve according to actual usage of the UDF. In this manner, the performance of processing a UDF is optimized.

Figure 1:
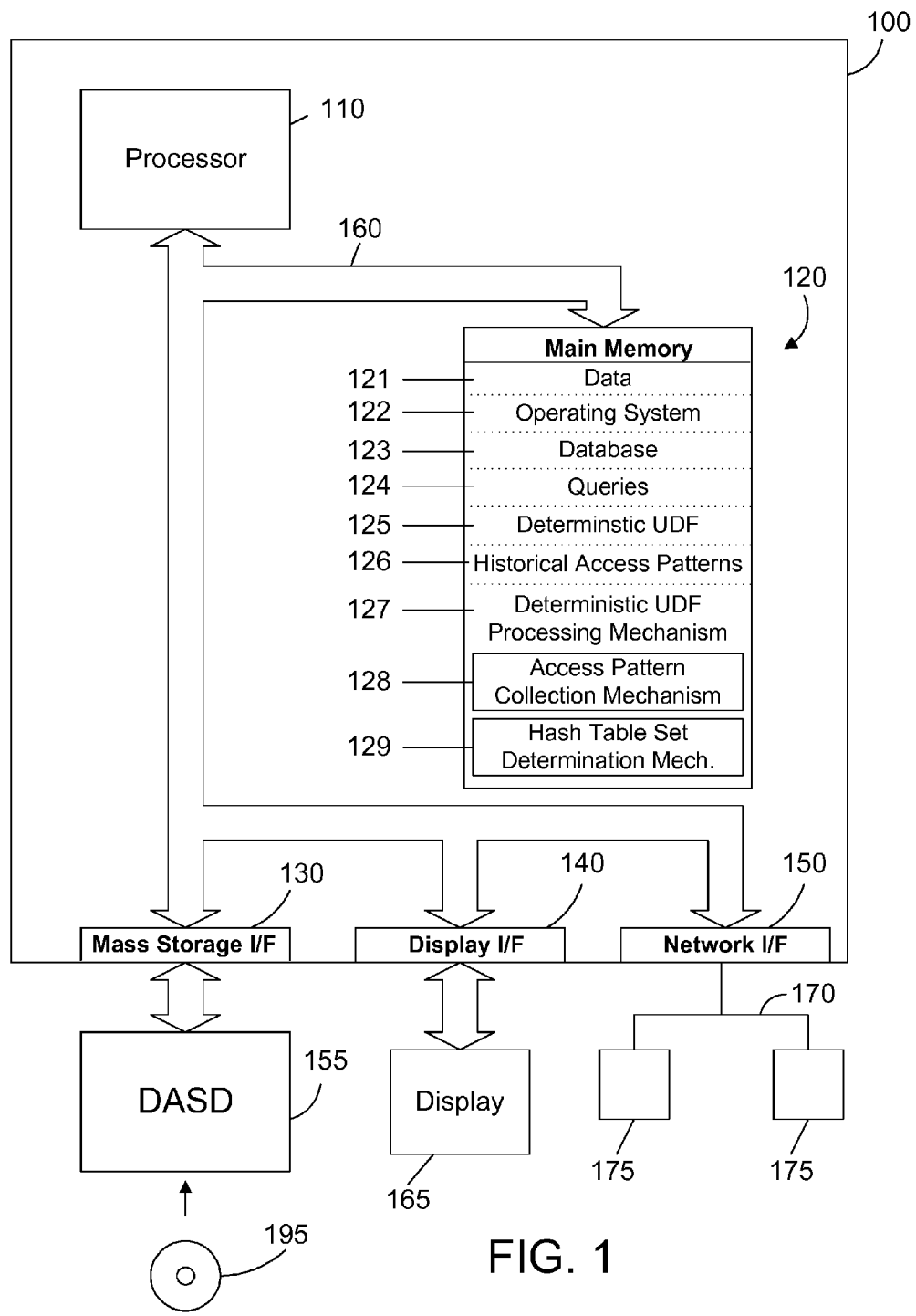
FIG. 1 is a block diagram of an apparatus that processes deterministic user-defined functions (UDFs) using multiple hash tables.

Referring to FIG. 1, a computer system 100 is one suitable implementation of a computer system that includes a deterministic UDF processing mechanism that improves performance of processing UDFs by allocating multiple hash tables to a UDF, when needed, and by dynamically adjusting the allocation of multiple hash tables according to historical access patterns over time. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, a database 123, one or more queries 124, a deterministic user-defined function (UDF) 125, historical access patterns 126, and a deterministic UDF processing mechanism 127. Data 121 represents any data that serves as input to or output from any program in computer system 100. Operating system 122 is a multitasking operating system known in the industry as i5/OS; however, those skilled in the art will appreciate that the spirit and scope of this disclosure is not limited to any one operating system. Database 123 is any suitable database, whether currently known or developed in the future. Database 123 preferably includes one or more tables that have one or more columns. Queries 124 include any suitable database query, including an SQL query. Deterministic UDF 125 is a user-defined function that may be executed by itself, or may be referenced in one or more query 124. Historical access patterns 126 indicate how data was accessed in the past in processing the deterministic UDF 125. The historical access patterns 126 are collected by the access pattern collection mechanism 128. The deterministic UDF processing mechanism 127 improves the processing of UDF 125 by allocating multiple hash tables to a UDF according to the historical access patterns 126 collected by the access pattern collection mechanism 128. The hash table set determination mechanism 129 determines how many hash tables are needed for a given UDF, and how these hash tables should be allocated to different columns accessed by the UDF.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, queries 124, deterministic UDF 125, historical access patterns 126, and deterministic UDF processing mechanism 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a deterministic UDF processing mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

At this point, it is important to note that while the description above is in the context of a fully functional computer system, those skilled in the art will appreciate that the deterministic UDF processing mechanism may be distributed as an article of manufacture in a variety of forms, and the claims extend to all suitable types of computer-readable media that bear instructions that may be executed by a computer. Examples of suitable computer-readable media include recordable media such as floppy disks and CD-RW (e.g., 195 of FIG. 1).

The deterministic UDF processing mechanism may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
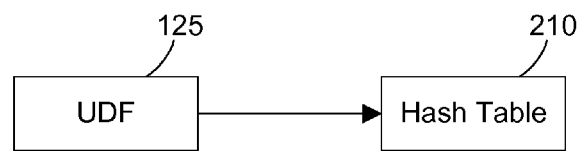
FIG. 2 is a block diagram of a prior art implementation that allocates a single hash table to a user-defined function.
Figure 3:
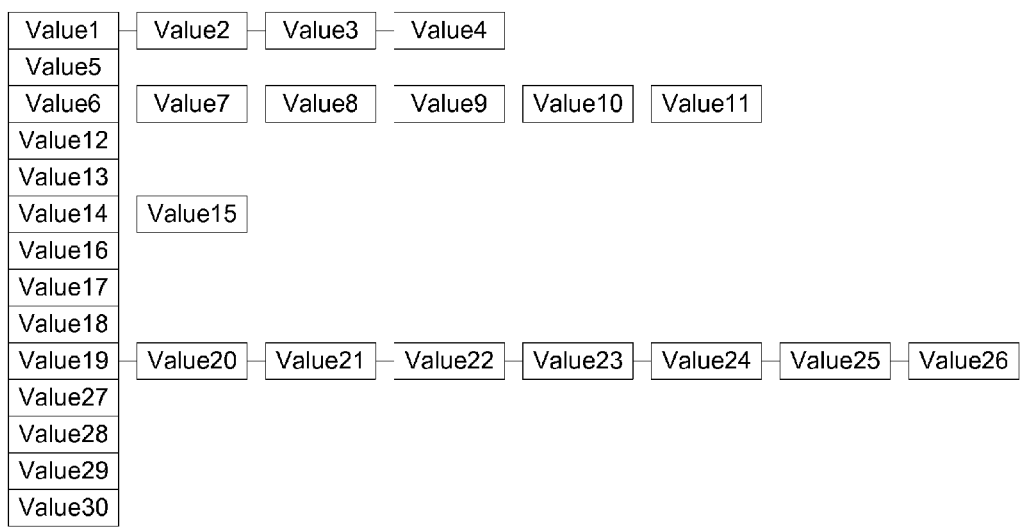
FIG. 3 is a sample block diagram of a hash table showing poor performance that can result from allocating the single hash table in FIG. 2 to a deterministic UDF.

Referring to FIG. 2, a block diagram shows it is known in the art to assign a single hash table 210 to a user-defined function 125. Using a single hash table can present performance problems, especially when the UDF accesses columns with data in disjoint sets. FIG. 3 shows a block diagram representation of a sample hash table. A hash table is most effective when it has a single value for each entry in the table. We see from this example that several entries in the hash table have single values, including Value5, Value12, Value13, Value16, Value17, Value18, Value27, Value28, Value29 and Value30. Note, however, that the remaining entries have multiple values. Thus, we see the entry that includes Value1 also includes Value2, Value3 and Value4. The entry that includes Value6 also includes Value7, Value8, Value9, Value10 and Value11. The entry that includes Value14 also includes Value15. The entry that includes Value19 also includes Value20, Value21, Value22, Value23, Value24, Value25 and Value26. When a user-defined function accesses an entry in the hash table that has multiple values, it must do a linear scan in the hash table entry to find the desired value. This is inefficient and negatively impacts system performance. FIG.

3 illustrates how using a single hash table for a deterministic UDF can cause performance problems when processing the UDF.

Figure 4:
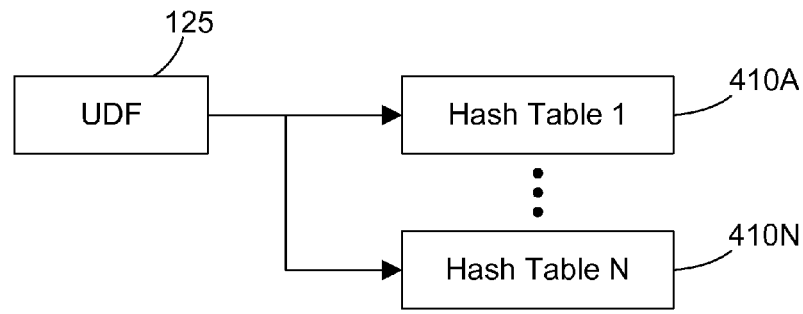
FIG. 4 is a block diagram of a UDF that is allocated multiple hash tables.

Referring to FIG. 4, the disclosure and claims herein solve the performance problem presented by using a single hash table by allocating multiple hash tables to a single user-defined function. Thus, a UDF 125 may include multiple hash tables, represented in FIG. 4 as hash table 410A, . . . , hash table 410N. By allocating multiple hash tables to a single UDF, the performance of processing the UDF is improved.

Figure 5:
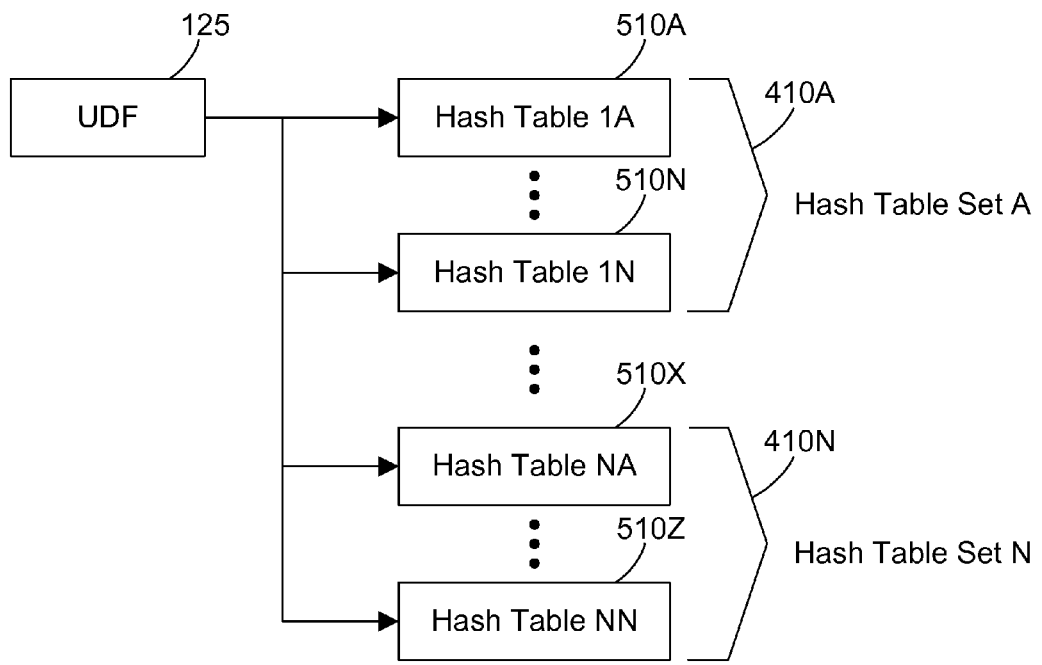
FIG. 5 is a block diagram of a UDF that is allocated multiple sets of hash tables.

FIG. 5 shows a more specific example of FIG. 4, where multiple sets of hash tables are allocated to the UDF 125. Thus, Hash Table Set A 410A includes multiple hash tables, represented in FIG. 5 as hash table 510A, . . . , hash table 510N. In similar fashion, the Hash Table Set N 410N includes multiple hash tables, represented in FIG. 5 as hash table 510X, . . . , hash table 510Z. By allocating sets of hash tables to a single UDF as shown in FIG. 5, the performance of the UDF may be optimized.

Figure 6:
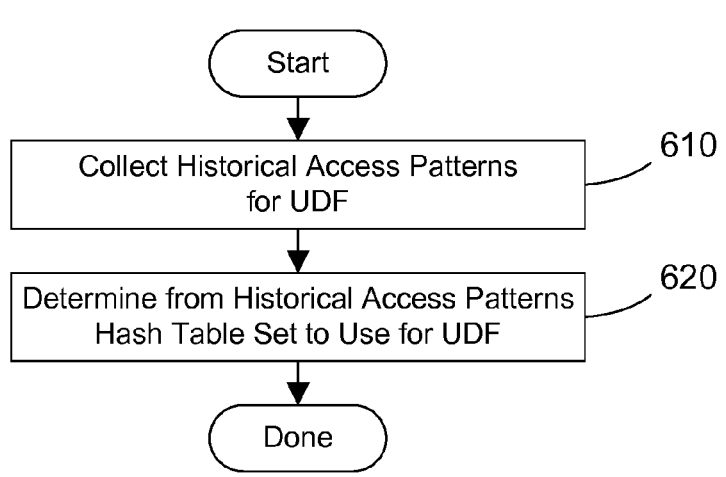
FIG. 6 is a method for allocating multiple hash tables to a UDF to improve performance in processing the UDF.

Method 600 in FIG. 6 shows how multiple hash tables may be allocated to a single user-defined function. First, historical access patterns for the UDF are collected (step 610). The historical access patterns may specify which columns in one or more database tables have been accessed by the UDF in the past. Next, based on the historical access patterns, a suitable hash table set for the UDF is determined (step 620). Note the term "hash table set" broadly means any group of multiple hash tables that are allocated to a UDF. By allocating multiple hash tables to a single UDF, the performance problems that may arise by using a single hash table for a UDF are reduced.

Figure 7:
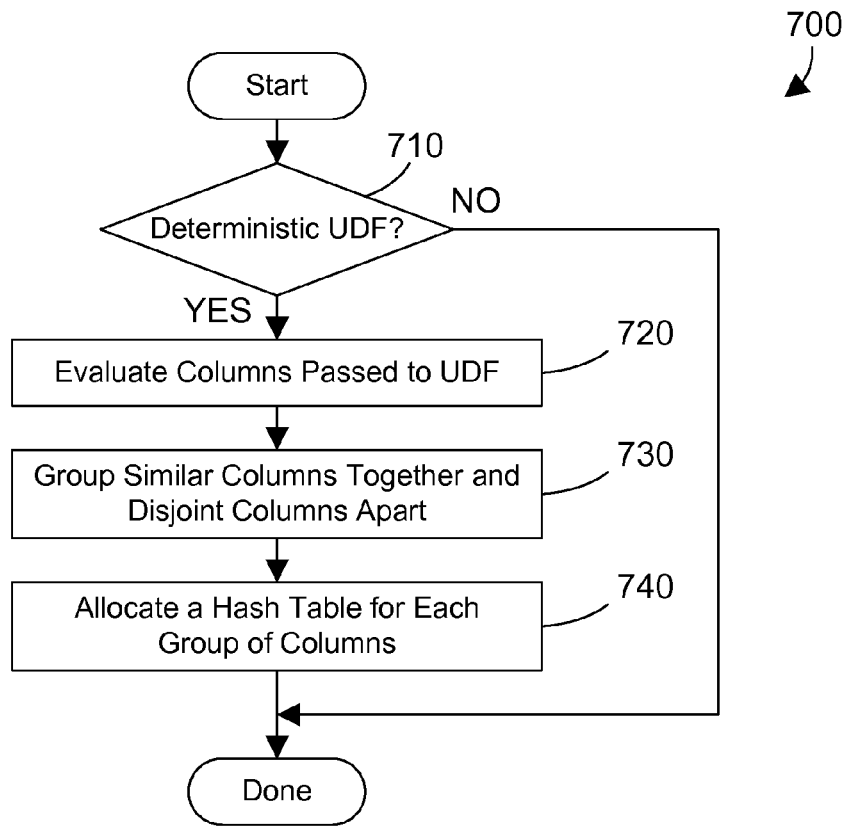
FIG. 7 is one specific implementation for method 600 in FIG. 6.

Referring to FIG. 7, a method 700 is one suitable implementation of method 600 in FIG. 6. If the UDF is not deterministic (step 710=NO), method 700 is done. If the UDF is deterministic (step 710=YES), the columns passed to the UDF are evaluated (step 720). Similar columns are grouped together, and disjoint columns are grouped apart (step 730). Columns are similar if they have cardinality that is not a disjoint set. Disjoint columns have cardinalities that are disjoint sets, meaning there is no overlap in their values. Once the columns are grouped in step 730, a hash table may be allocated to each group (step 740). A simple example will illustrate. Let's assume columns C1, C3, C4 and C7 are passed to a UDF (step 720). Let's further assume columns C1 and C3 are similar, while columns C4 and C7 are disjoint. In this example, columns C1 and C3 would be grouped together, and C4 and C7 would stand alone (step 730). A hash table is then allocated to each group, meaning a first hash table for C1 and C3, a second hash table for C4, and a third hash table for C7 (step 740). In this manner, multiple hash tables are allocated to a single UDF to improve performance in processing the UDF.

Figure 8:
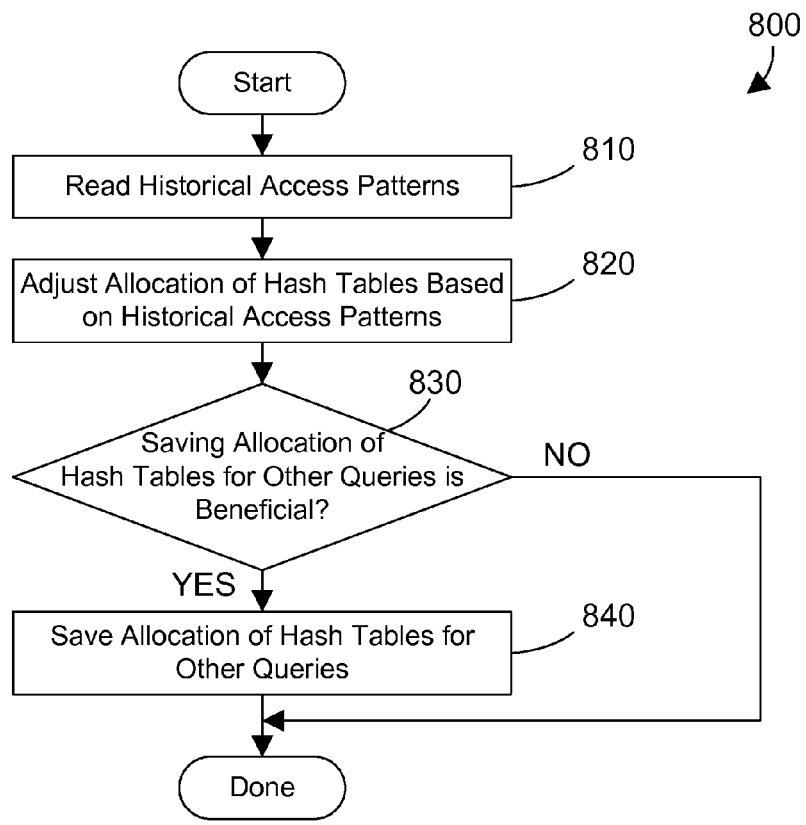
FIG. 8 is a method for adjusting the allocation of hash tables in a UDF over time.

Referring to FIG. 8, a flow diagram shows a method that may be optionally performed after an initial allocation of multiple hash tables to a UDF has already been performed. Once multiple hash tables have been allocated to a UDF using method 600 in FIG. 6 or using method 700 in FIG. 7 (as shown in FIGS. 4 and 5), the allocation of hash tables may be dynamically adjusted according to historical access patterns for the UDF that continue to be collected as time goes on. The historical access patterns for a UDF are read (step 810). The allocation of hash tables to the UDF may then be adjusted based on the historical access patterns (step 820). For example, let's assume for the simple example above that historical access patterns show column C4 has now become similar to columns C1 and C3 as time progresses. One suitable adjustment in step 820 would be to allocate the same hash table for C1 and C3 to C4 as well, eliminating the need for the hash table that was previously allocated to C4.

Another suitable improvement may be made by determining whether or not saving the allocation of hash tables for other queries would be beneficial. In the prior art, a hash table is allocated for a single query. In the disclosure and claims herein, the hash table could be used for other queries as well. If saving the allocation of hash tables for other queries is beneficial (step 830=YES), the allocation of hash tables is saved for other queries (step 840). If saving the allocation of hash tables for other queries is not beneficial (step 830=NO), method 800 is done.

Figure 9:
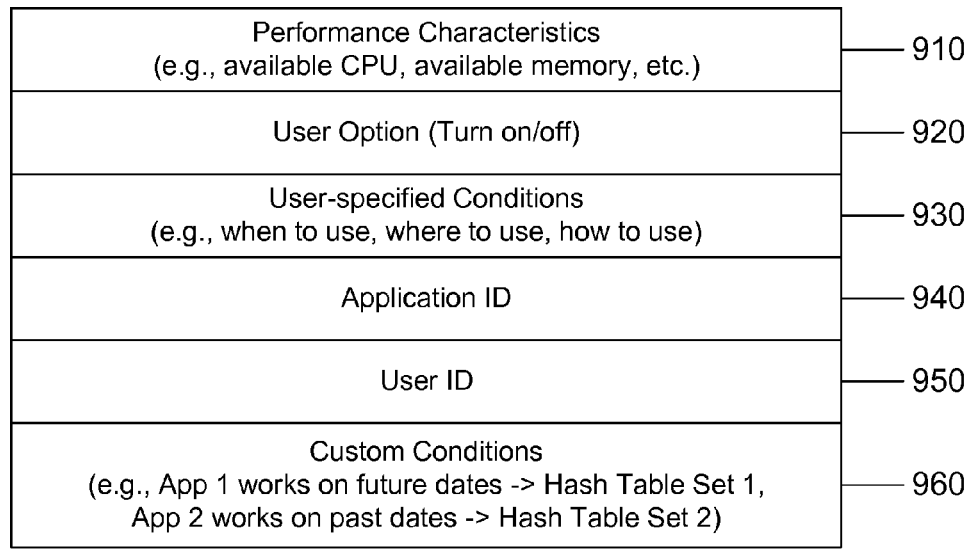
FIG. 9 is a block diagram showing various user-defined criteria that may be used to determine whether, when and how to save an allocation of hash tables for other queries.

Several user-defined criteria could be used to determine whether saving the allocation of hash tables for other queries is beneficial in step 830 in FIG. 8. Examples of suitable user-defined criteria are shown in FIG. 9. For example, performance characteristics 910 could be used to determine whether or not to save the allocation of hash tables for other queries. Examples of performance characteristics include available CPU capacity, available memory, etc. A manually-specified user option 920 may be specified to turn on or off the option to save allocation of hash tables for other queries. User-specified conditions 930 could be specified that would determine when, where and how to save the allocation of hash tables for other queries. An application ID 940 could be used to specify that the allocation of hash tables could be saved for other queries from an application that matches the application ID. User ID 950 could be used to specify that the allocation of hash tables could be saved for other queries from a user that matches the user ID. Custom conditions 960 may include any suitable criteria. For example, custom conditions 960 could specify that one application works on future dates, and therefore needs a first hash table set, while a second application works on past dates, and therefore needs a second hash table set. Note the user-defined criteria in the table in FIG. 9 are simply examples of some suitable criteria that could be used, and are not intended as limiting of the scope of the disclosure or claims herein. In addition, any suitable algorithm could be used that combines any or all of the user-defined criteria shown in FIG. 9. The disclosure and claims expressly extend to any suitable criteria that may be used to determine whether, when or how to save an allocation of hash tables for other queries.

The deterministic UDF processing mechanism disclosed and claimed herein specifies multiple hash tables for a single UDF to enhance the speed of processing the UDF. The multiple hash tables may be allocated to the UDF according to historical access patterns of the UDF. In addition, the allocation of hash tables to a UDF may be dynamically adjusted according to historical access patterns as time goes forward.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. An apparatus comprising:
   at least one processor;
   a memory coupled to the at least one processor;
   a deterministic user-defined function (UDF) residing in the memory and executed by the at least one processor, the deterministic UDF accessing at least one database table; and
   a deterministic user-defined function processing mechanism residing in the memory and executed by the at least one processor, the deterministic user-defined function processing mechanism collecting historical access patterns that indicate how the deterministic UDF accesses the at least one database table, and allocating a plurality of hash tables to the deterministic UDF based on the historical access patterns, wherein the deterministic user-defined function processing mechanism allocates the plurality of hash tables by evaluating columns passed to the deterministic UDF, grouping similar columns together and disjoint columns apart, and allocating one of the plurality of hash tables to each group of columns.

2. The apparatus of claim 1 wherein the deterministic user-defined function processing mechanism dynamically adjusts the allocation of the plurality of hash tables according to the historical access patterns as the historical access patterns change over time.

3. The apparatus of claim 1 wherein the deterministic user-defined function processing mechanism determines from user-specified criteria whether to save the allocation of the plurality of hash tables for use with a plurality of queries.

4. The apparatus of claim 3 wherein the user-specified criteria include: performance characteristics, user option to turn on or off, user-specified conditions, application identifier, user identifier, and custom conditions.

5. The apparatus of claim 3 wherein the deterministic user-defined function processing mechanism saves the allocation of the plurality of hash tables for use with the plurality of queries.

6. A computer-implemented method for processing a deterministic user-defined function (UDF), the method comprising the steps of:
   (A) collecting historical access patterns that indicate how the deterministic UDF accesses at least one database table; and
   (B) allocating a plurality of hash tables to the deterministic UDF based on the historical access patterns by performing the steps of:
      evaluating columns passed to the deterministic UDF;
      grouping similar columns together and disjoint columns apart; and
      allocating one of the plurality of hash tables to each group of columns.

7. The method of claim 6 further comprising the step of dynamically adjusting the allocation of the plurality of hash tables according to the historical access patterns as the historical access patterns change over time.

8. The method of claim 6 further comprising the step of determining from user-specified criteria whether to save the allocation of the plurality of hash tables for use with a plurality of queries.

9. The method of claim 8 wherein the user-specified criteria includes: performance characteristics, user option to turn on or off, user-specified conditions, application identifier, user identifier, and custom conditions.

10. The method of claim 8 further comprising the step of saving the allocation of the plurality of hash tables for use with the plurality of queries.

11. A computer-implemented method for processing a deterministic user-defined function (UDF), the method comprising the steps of:
   (A) collecting historical access patterns that indicate how the deterministic UDF accessed a plurality of columns in at least one database table;
   (B) evaluating columns passed to the deterministic UDF from the historical access patterns;
   (C) grouping from step (B) similar columns together and disjoint columns apart;
   (D) allocating one of a plurality of hash tables to each group of columns in step (C);
   (E) dynamically adjusting the allocation of the plurality of hash tables in step (D) according to the historical access patterns as the historical access patterns change over time;
   (F) determining from user-specified criteria whether to save the allocation of the plurality of hash tables for use with a plurality of queries wherein the user-specified criteria includes performance characteristics, user option to turn on or off, user-specified conditions, application identifier, user identifier, and custom conditions; and
   (G) if the user-specified criteria specifies to save the allocation of the plurality of hash tables for use with the plurality of queries, saving the allocation of the plurality of hash tables for use with the plurality of queries.

12. An article of manufacture comprising:
   a deterministic user-defined function processing mechanism that collects historical access patterns that indicate how a deterministic user-defined function (UDF) accesses at least one database table, and allocates a plurality of hash tables to the deterministic UDF based on the historical access patterns, wherein the deterministic user-defined function processing mechanism allocates the plurality of hash tables by evaluating columns passed to the deterministic UDF, grouping similar columns together and disjoint columns apart, and allocating one of the plurality of hash tables to each group of columns; and
   recordable media bearing the deterministic user-defined function processing mechanism.

13. The article of manufacture of claim 12 wherein the deterministic user-defined function processing mechanism dynamically adjusts the allocation of the plurality of hash tables according to the historical access patterns as the historical access patterns change over time.

14. The article of manufacture of claim 12 wherein the deterministic user-defined function processing mechanism determines from user-specified criteria whether to save the allocation of the plurality of hash tables for use with a plurality of queries.

15. The article of manufacture of claim 14 wherein the user-specified criteria includes: performance characteristics, user option to turn on or off, user-specified conditions, application identifier, user identifier, and custom conditions.

16. The article of manufacture of claim 14 wherein the deterministic user-defined function processing mechanism saves the allocation of the plurality of hash tables for use with the plurality of queries.

* * * * *